(12) United States Patent
Kanai (Popovici)

(10) Patent No.: US 8,975,524 B2
(45) Date of Patent: Mar. 10, 2015

(54) GROMMET

(75) Inventor: Mary Kanai (Popovici), Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 139 days.

(21) Appl. No.: 13/880,551

(22) PCT Filed: Mar. 28, 2011

(86) PCT No.: PCT/JP2011/057660
§ 371 (c)(1),
(2), (4) Date: Apr. 19, 2013

(87) PCT Pub. No.: WO2012/056748
PCT Pub. Date: May 3, 2012

(65) Prior Publication Data
US 2013/0199823 A1 Aug. 8, 2013

(30) Foreign Application Priority Data

Oct. 29, 2010 (JP) ................................. 2010-244258

(51) Int. Cl.
*H02G 3/22* (2006.01)
*H02G 3/04* (2006.01)
*B60R 16/02* (2006.01)

(52) U.S. Cl.
CPC ............... *H02G 3/22* (2013.01); *H02G 3/0468* (2013.01); *B60R 16/0222* (2013.01)
USPC ...................... 174/152 G; 174/153 G; 248/56; 16/2.1; 439/604

(58) Field of Classification Search
USPC ......... 174/152 G, 153 G; 16/2.1, 2.2; 248/56; 439/604; 277/606
See application file for complete search history.

(56) References Cited

U.S. PATENT DOCUMENTS

| | | | |
|---|---|---|---|
| 6,085,795 A | 7/2000 | Ogawa et al. | |
| 7,020,931 B1 * | 4/2006 | Burnett et al. | 16/2.2 |
| 7,383,610 B2 * | 6/2008 | Mockett | 16/2.1 |
| 8,592,685 B2 * | 11/2013 | Kamenoue | 174/152 G |
| 8,704,099 B2 * | 4/2014 | Agusa | 174/152 G |

FOREIGN PATENT DOCUMENTS

| | | |
|---|---|---|
| JP | 09-092062 | 4/1997 |
| JP | 11-150833 | 6/1999 |
| JP | 2003-348736 | 12/2003 |
| JP | 2004-274886 | 9/2004 |
| JP | 2007-186134 | 7/2007 |
| JP | 2008-230352 | 10/2008 |

OTHER PUBLICATIONS

International Search Report of Apr. 26, 2011.

* cited by examiner

*Primary Examiner* — Dhirubhai R Patel
(74) *Attorney, Agent, or Firm* — Gerald E. Hespos; Michael J. Porco; Matthew T. Hespos

(57) ABSTRACT

A grommet has an engagement tube with an elliptical cross-section and is provided continuous with and bent from a leading end of a narrow tube through which the wire harness passes while coming into close contact therewith. An annular vehicle body engagement recess is provided in an outer circumferential surface of the engagement tube. Arc-side reinforcements protrude radially inward at connecting positions between a circumferential wall of the narrow tube and arc-shaped circumferential walls of the engagement tube that face each other in a major axis direction. The thickness of the arc-side reinforcements is greater than the thickness of connecting positions between the circumferential wall of the narrow tube and respective linear circumferential walls that face each other in a minor axis direction.

13 Claims, 4 Drawing Sheets

GROMMET

BACKGROUND

1. Field of the Invention

The present invention relates to a grommet and more specifically a grommet that is externally fitted and fixed to a wire harness, the wire harness being arranged in an automobile, and placed in a through hole of a vehicle body in order to achieve protection of the wire harness, waterproofing, dustproofing, and sound insulation. In particular, the present invention relates to a grommet that is prevented from deforming due to contact with an end of a corrugated tube which is continuous with the grommet and in which the wire harness is sheathed and is prevented from being placed at a tilt in a vehicle body panel.

2. Description of the Related Art

Conventionally, a wire harness arranged in a back door of an automobile is led out from a through hole provided in the back door and routed to a through hole of a vehicle body.

As shown in FIG. 8, that region of a wire harness which is routed from a through hole H1 of a back door 100 to a through hole H2 of a vehicle body 110 is sheathed in a grommet 120 made of a rubber or an elastomer, and vehicle body engagement portions 121 and 122 that are provided at respective ends of the grommet 120 are internally fitted to and engaged with the through holes H1 and H2 on the respective sides (see JP 9-92062A and JP 2008-230352A).

Specifically, the vehicle body engagement portion 121 of the grommet 120 is formed by providing a truncated cone-shaped tube portion 126 having an elliptical shape that is continuous with a leading end of a bellows-like tube portion 125, and providing an annular engagement groove 127 in an outer circumferential surface of a circumferential wall 126b extending from the outer circumference of a bottom wall 126a of the truncated cone-shaped tube portion 126.

When inserted and fixed into the through hole H2 of the vehicle body 110, the vehicle body engagement portion 121 is pushed into the through hole H2 from a leading end of the circumferential wall 126b, and fixed to the vehicle body 110 by a circumferential edge of the through hole H2 being inserted into, and thus fitted in and engaged with the engagement groove 127.

The wire harness that is routed through the through hole H2 of the vehicle body 110 and arranged in the vehicle body side is usually sheathed in a corrugated tube 130, which is a resin molded product, as shown in FIG. 9. There are cases where a leading end 130a of the corrugated tube 130 is inserted into the inside of the truncated cone-shaped tube portion 126 of the vehicle body engagement portion 121 of the grommet 120 and comes into contact with the circumferential wall 126b and the bottom wall 126a, pushing up and deforming the circumferential wall 126b.

If the circumferential wall 126b of the vehicle body engagement portion 121 deforms as described above, the engagement groove 127 provided in the outer circumference of the circumferential wall 126b may also deform and thus the grommet 120 be attached at a tilt to the through hole H2 of the vehicle body 110. In this case, a certain portion of the entire circumference of the engagement groove 127 does not accurately fit flush with the circumferential edge of the through hole H2, and in this portion, a gap is left between an inner circumferential surface of the through hole H2 and an outer circumferential surface of the engagement groove 127. There is a risk that water may leak into the inside of the vehicle body through this gap, and the leaked water move through spaces among the wires constituting the wire harness to reach a connector (not shown) that is connected to a leading end thereof, causing a short circuit between terminals in the connector.

The invention has been made to solve the above-described problem, and it is an object thereof to enable a vehicle body engagement portion of a grommet to be placed in a through hole of a vehicle body without leaving a gap therebetween and to prevent the occurrence of a water leak, by preventing the vehicle body engagement portion from deforming even if a leading end of a corrugated tube is inserted into and comes into contact with the inside of the vehicle body engagement portion of the grommet when a wire harness is sheathed in the grommet and the wire harness leading out of the grommet is sheathed in the corrugated tube.

SUMMARY OF THE INVENTION

To achieve the above-described object, the invention provides a grommet that is externally fitted to a wire harness and placed in a through hole formed in a vehicle body panel, the grommet being made of a rubber or an elastomer, wherein an engagement tube portion having an elliptical cross-sectional shape is provided so as to be continuous with and bent from a leading end of a narrow tube portion through which the wire harness passes while coming into close contact therewith, an annular vehicle body engagement recess is provided in an outer circumferential surface of a circumferential wall of the engagement tube portion, and arc-side reinforcement portions protruding in an inward radial direction are provided at respective connecting positions between a circumferential wall of the narrow tube portion and arc-shaped circumferential walls of the engagement tube portion that face each other in a major axis direction, and the thickness of the arc-side reinforcement portions is set to be greater than the thickness of connecting positions between the circumferential wall of the narrow tube portion and respective linear circumferential walls that face each other in a minor axis direction.

Thick portions of the respective arc-side reinforcement portions are located at inner surfaces that oppose the vehicle body engagement recess, and the thick portions are not extended to an inner surface side of an opening-side leading end of the engagement tube portion so that the opening-side leading end of the engagement tube portion has flexibility that is required during insertion into the through hole of the vehicle body panel.

Since, as described above, the inner surfaces that oppose the vehicle body engagement recess are made to constitute the thick portions, deformation of the vehicle body engagement recess that is engaged with the through hole of the vehicle body panel is prevented, so that no gap is left therebetween, and thus a water leak is prevented. Specifically, the thick portions extend to at least a position of an inner surface of an engagement extension with which a circumferential edge of the through hole of the vehicle body panel comes into contact. Moreover, since the thick portions are not extended to the inner surface of the leading end opening side of the engagement tube portion, the ease of bending and hence the ease of insertion into the through hole of the vehicle body panel are achieved.

Specifically, the arc-side reinforcement portions having an increased thickness and an increased height are provided by applying padding in a thickness direction to inner surfaces of respective stepped portions protruding in the inward radial direction from connecting portions between the circumferential wall of the narrow tube portion and the arc-shaped circumferential walls of the engagement tube portion, and applying padding in a height direction to opening-side end surfaces of the respective stepped portions.

In addition, long, narrow linear stepped portions are provided in respective connecting portions between the narrow tube portion and the linear circumferential walls of the engagement tube portion that face each other in the minor axis direction, and padding is not applied to inner surfaces and opening-side end surfaces of the respective linear stepped portions, so that those portions are not reinforced.

Both of the pair of arc-side reinforcement portions extend straight in an axial direction to the narrow tube portion side, one of the arc-side reinforcement portions that is situated on the outer circumferential side of the bend with respect to the narrow tube portion constitutes a long reinforcement portion extending to a bending point of the narrow tube portion on the outer circumferential side, and the other arc-side reinforcement portion that is situated on the inner circumferential side constitutes a short reinforcement portion extending to a bending point of the narrow tube portion on the inner circumferential side.

One of the pair of arc-side reinforcement portions that is situated on the outer circumferential side of the bend with respect to the narrow tube portion has a greater thickness of padding applied to the inner surface and is thicker than the other arc-side reinforcement portion that is situated on the inner circumferential side. The reason for this is that if the thickness of the inner surface on the inner circumferential side is increased even further by padding, the wires of the wire harness passing through the narrow tube portion tend to interfere with one another.

In the grommet of the invention, since the shape of the through hole formed in the vehicle body is elliptical, the engagement tube portion of the grommet that is internally fitted to and engaged with the elliptical through hole is made to have an elliptical shape. The narrow tube portion that is continuous with the elliptical engagement tube portion has a circular cross-sectional shape, and therefore, stepped portions are formed at the connecting positions between the narrow tube portion and the engagement tube portion, the stepped portions protruding in the inward radial direction from the inner circumferential surfaces of the respective arc-shaped circumferential walls of the engagement tube portion that face each other in the major axis direction.

On the other hand, the narrow linear stepped portions are formed in respective connecting portions between the narrow tube portion and the linear circumferential walls on opposite sides of the engagement tube portion that face each other in the minor axis direction, or alternatively, those linear stepped portions are not formed, and the connecting portions extend linearly.

Accordingly, if the corrugated tube in which the wire harness leading out from the leading end opening of the engagement tube portion is sheathed abuts against the engagement tube portion of the grommet, the linear circumferential walls are not thrust up by the leading end of the corrugated tube and are not likely to deform and tilt, because the distance between the linear circumferential walls on opposite sides is small, and within the engagement tube portion, the stepped portions hardly protrude inward from the inner surfaces of the respective linear circumferential walls.

On the other hand, since the distance between the arc-shaped circumferential walls on opposite sides is large, and the stepped portions protrude inward, the leading end of the corrugated tube is pressed against the arc-shaped circumferential walls, and the arc-shaped circumferential walls are likely to deform.

In light of the features of the elliptical engagement tube portion described above, in the grommet of the invention, as described above, reinforcement is achieved so that the arc-shaped circumferential walls, which are likely to deform when coming into contact with the leading end of the corrugated tube, have an increased internal thickness, and thus the occurrence of deformation and a tilt of the engagement tube portion due to the contact with the corrugated tube is prevented.

In this manner, by varying the thickness of the elliptical engagement tube portion in the circumferential direction, deformation of a portion that is likely to deform is prevented, and the vehicle body engagement recess of the engagement tube portion is attached to the through hole of the vehicle body such that it is in close contact the circumferential edge of with the through hole, and thus the occurrence of a water leak is prevented.

Furthermore, a flange portion is provided in the engagement tube portion, the flange portion protruding in an outward radial direction from a base portion of the circumferential wall, and a recess for engagement with the vehicle body is formed between the flange portion and the circumferential wall, and a guide for alignment is marked in the flange portion.

When the guide for alignment is provided in the grommet in this manner, when a corresponding guide is provided in the circumferential edge of the through hole of the vehicle body, the attachment operation is facilitated.

It is preferable that the grommet of the invention is attached to a wire harness that is arranged between a back door and a vehicle body of an automobile, and has a shape including an engagement tube portion that is provided at one end in a length direction and engaged with a through hole of the back door, an engagement tube portion that is provided at the other end in the length direction and engaged with a through hole of the vehicle body, and a narrow tube portion and a bellows-like tube portion that are interposed between the engagement tube portions at the respective ends.

It is preferable that in the grommet, a flat surface that comes into close contact with the vehicle body is provided in a top portion of a ridge portion of the bellows-like tube portion that is close to the engagement tube portion.

With this configuration, in a state in which the engagement tube portion is internally fitted to and engaged with the through hole of the vehicle body, the bellows-like tube portion can be stably brought into contact with the surface of the vehicle body.

As described above, in the grommet of the invention, reinforcement portions are provided by applying padding to required portions of the elliptical engagement tube portion, and therefore even if the leading end of the corrugated tube in which the wire harness leading out of the grommet is sheathed is pressed against the engagement tube portion, the occurrence of deformation such as a tilt can be prevented. Accordingly, the engagement recess provided in the grommet can be fixed to the circumferential edge of the through hole of the vehicle body panel such that the engagement recess is in close contact with the through hole, and the occurrence of a water leak can be prevented.

DETAILED DESCRIPTION OF THE PREFERRED EMBODIMENTS

Hereinafter, an embodiment of the invention will be described with reference to FIGS. 1 to 7.

Figure 1:
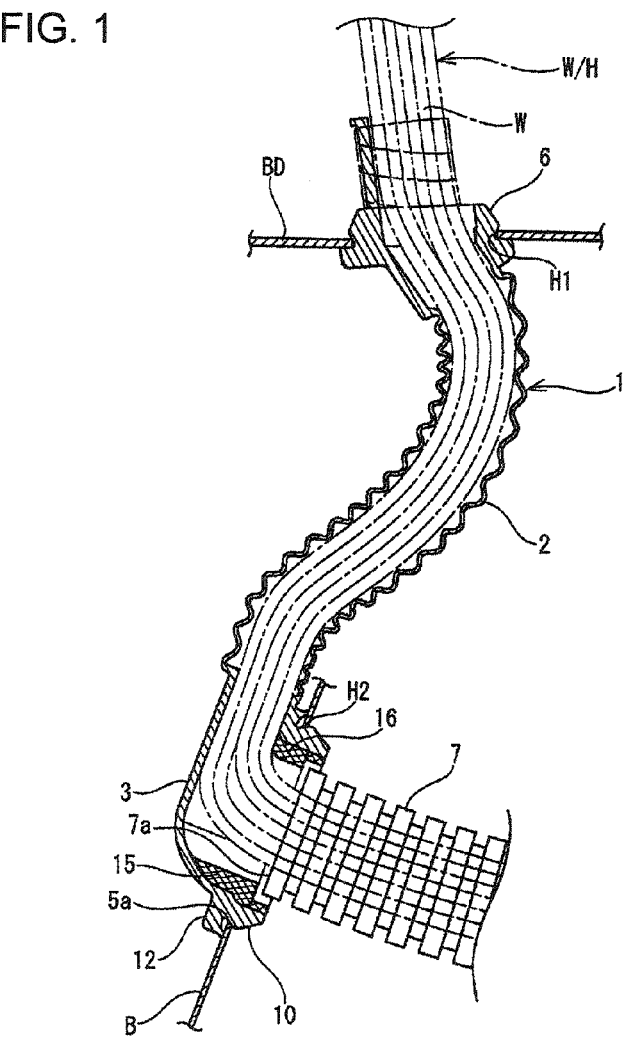
FIG. 1 is a cross-sectional view showing an example of usage of a grommet according to an embodiment of the invention.
Figure 2:
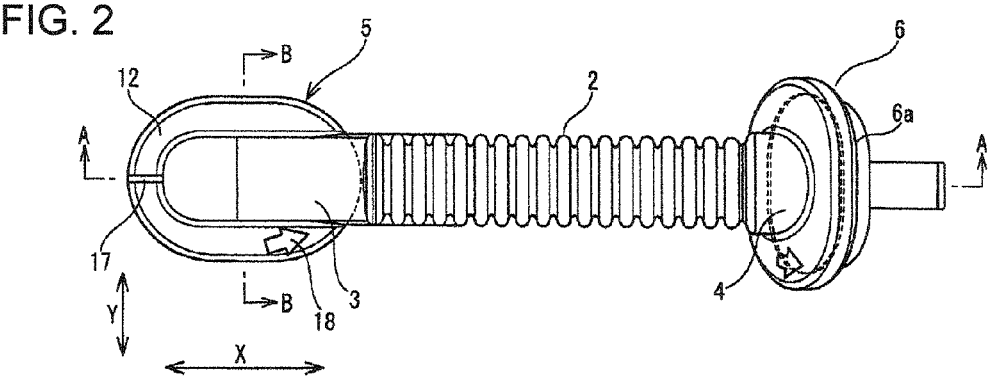
FIG. 2 is a plan view of the grommet according to the embodiment.

As shown in FIG. 1, a grommet 1 according to the embodiment is an outer covering in which a wire harness W/H is sheathed, the wire harness W/H being constituted by a plurality of wires W arranged so as to be routed between a back door BD and a vehicle body B of an automobile. The grommet 1 is integrally molded from a rubber or an elastomer (EPDM in the present embodiment) and has, as shown in FIGS. 1 to 4, a relatively narrow bellows-like tube portion 2 and narrow tube portions 3 and 4 that are bent and provided continuously with respective ends of the bellows-like tube portion 2. Wide engagement tube portions 5 and 6 for engagement with the vehicle body are provided at leading ends of the narrow tube portions 3 and 4, respectively. Vehicle body engagement recesses 5a and 6a are provided in outer circumferential surfaces of the respective engagement tube portions 5 and 6 so as to have annular shapes.

Through holes H1 and H2 that are formed in the back door BD and the vehicle body B, respectively, both have an elliptical shape, and accordingly, the engagement tube portions 5 and 6 are tube portions having elliptical shapes, and the annular vehicle body engagement recesses 5a and 6a, which are provided in the outer circumferences of the respective engagement tube portions, also are elliptical.

The engagement tube portion 5 is internally fitted to and engaged with the through hole H2 that is provided in the vehicle body B, and the engagement tube portion 6 is internally fitted to and engaged with the through hole H1 of the back door BD.

The wire harness W/H passing through the grommet 1 is inserted from the engagement tube portion 6 on the back door BD side, routed through the narrow tube portion 4, the bellows-like tube portion 2, the narrow tube portion 3, and the engagement tube portion 5, and led out from a leading end opening 5h of the engagement tube portion 5 into the vehicle body B.

The wire harness W/H leading out of the grommet 1 into the vehicle body B is made to pass through a corrugated tube 7 formed of a resin molded product and is sheathed in and protected by the corrugated tube 7. A leading end of the corrugated tube 7 is located on the leading end opening 5h side of the engagement tube portion 5 of the grommet 1. Thus, when the corrugated tube 7 is pushed up to the grommet 1 side, there is a risk that the leading end 7a of the corrugated tube 7 may be pressed against a leading end surface of a circumferential wall of the engagement tube portion 5 or may be inserted from the leading end opening 5h of the engagement tube portion 5 and pressed against an inner side of the engagement tube portion 5, resulting in the occurrence of deformation or a tilt of the engagement tube portion 5.

The grommet 1 of the invention is configured so that even if the leading end 7a of the corrugated tube 7 is pressed against the engagement tube portion 5, the engagement tube portion 5 does not deform or tilt.

The narrow tube portion 3 having the shape of half a cylinder extends continuously with and in the same axial direction with the bellows-like tube portion 2, and the engagement tube portion 5 that is inserted into and engaged with the through hole H2 of the vehicle body B is provided in the other half of the cylinder continuously with the narrow tube portion 3 so that the axial direction of the engagement tube portion 5 is perpendicular to the axial direction of the narrow tube portion 3. Thus, the wire harness W/H passing through the bellows-like tube portion 2 and a hollow portion of the narrow tube portion 3 is bent at 90 degrees on the leading end side of the narrow tube portion 3, passes through a hollow portion H of the engagement tube portion 5, and is lead out from the leading end opening 5h.

Figure 7:
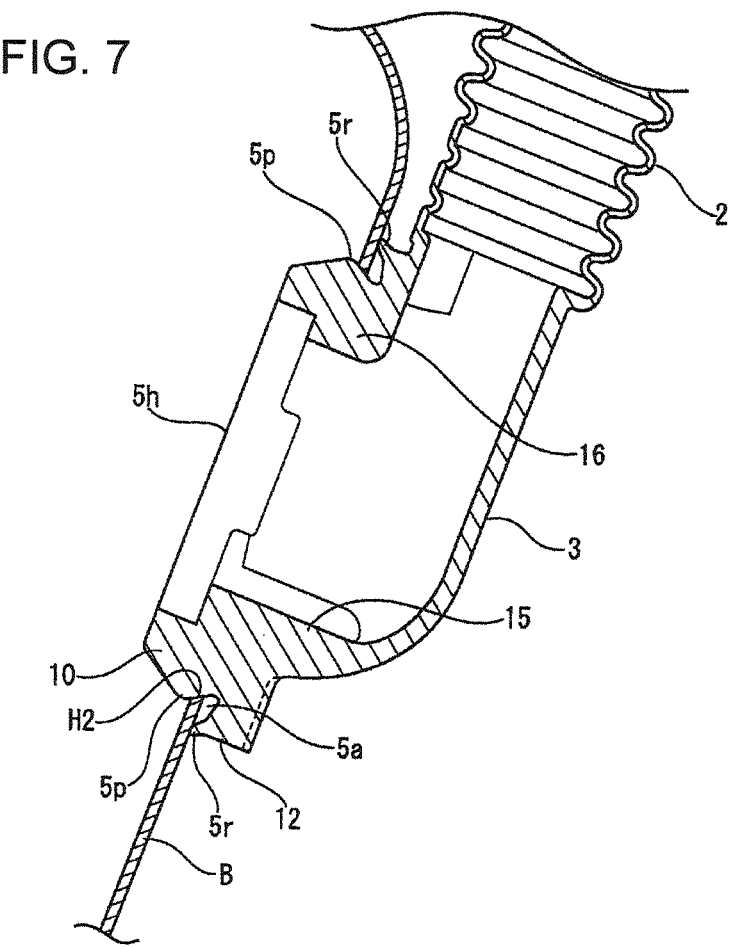
FIG. 7 is an enlarged cross-sectional view showing a state in which the grommet is engaged with a vehicle body panel.
Figure 8:
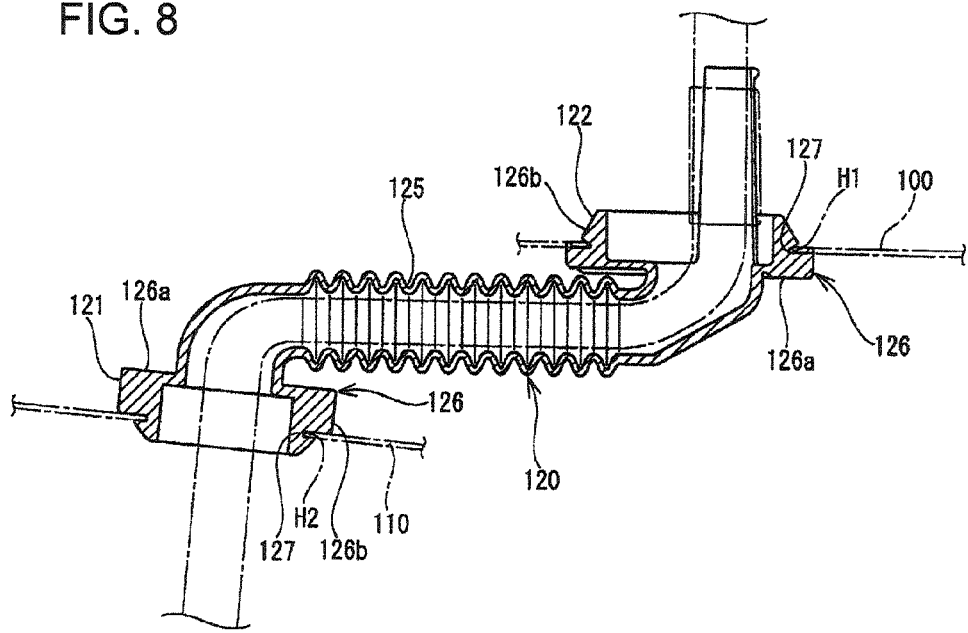
FIG. 8 is a cross-sectional view showing a conventional example.
Figure 9:
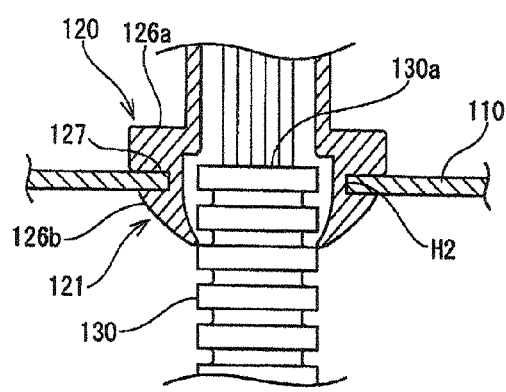
FIG. 9 is a diagram showing the point at issue.

The engagement tube portion 5 having an elliptical shape is provided with a stepped portion 11 protruding in an inward radial direction from a connecting position between a circumferential wall 10 of the engagement tube portion 5 and a circumferential wall 3a of the narrow tube portion 3. Moreover, a flange portion 12 protruding in an outward radial direction is provided in a base portion of the circumferential wall 10, and the vehicle body engagement recess 5a is formed between the circumferential wall 10 and the flange portion 12. Specifically, as shown in FIG. 7, an engagement lip 5r is formed so as to protrude from an outer circumferential end of the flange portion 12, a recess is formed that is recessed toward an inner circumferential side from the position at which the protruding engagement lip 5r is provided, and furthermore, a V-shaped protrusion is formed that protrudes toward the leading end side, and a protruding end of this V-shaped protrusion constitutes an engagement protrusion 5p. The engagement lip 5r is pressed against the vehicle body B so that the inner circumferential surface of the through hole H2 abuts against the engagement protrusion 5p.

The engagement tube portion 5 slopes inward from the engagement protrusion 5p toward the leading end opening 5h so that insertion into the through hole H2 is facilitated.

Figure 3:
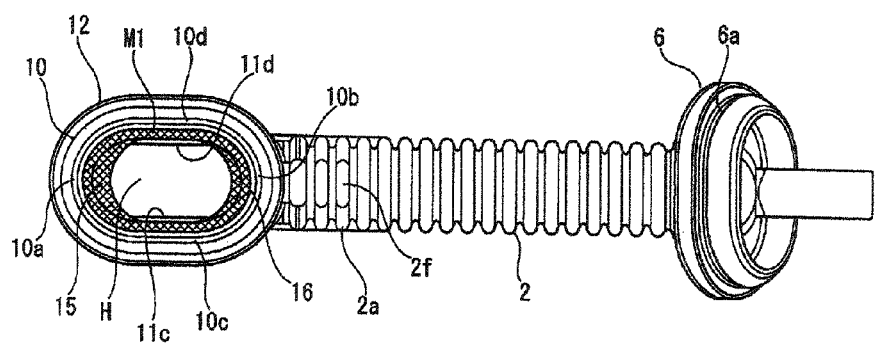
FIG. 3 is a perspective view of the grommet.
Figure 4:
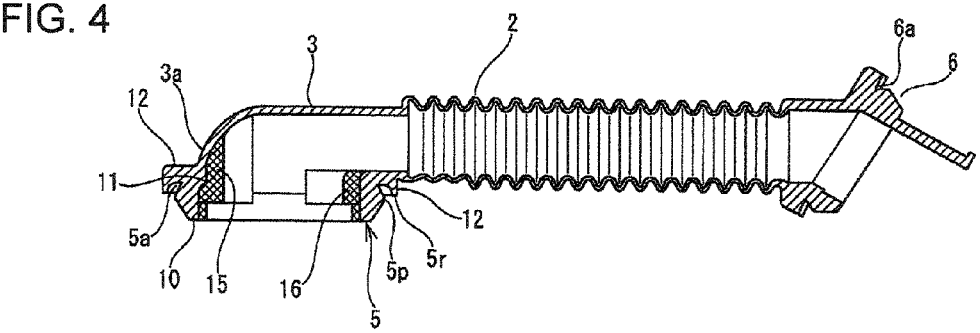
FIG. 4 is a cross-sectional view taken along line A-A of the grommet in FIG. 2.
Figure 5:
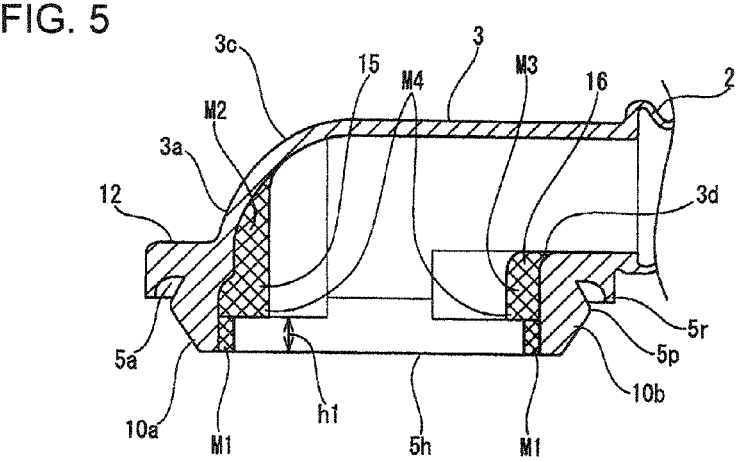
FIG. 5 is an enlarged view of a relevant portion of FIG. 4.
Figure 6:
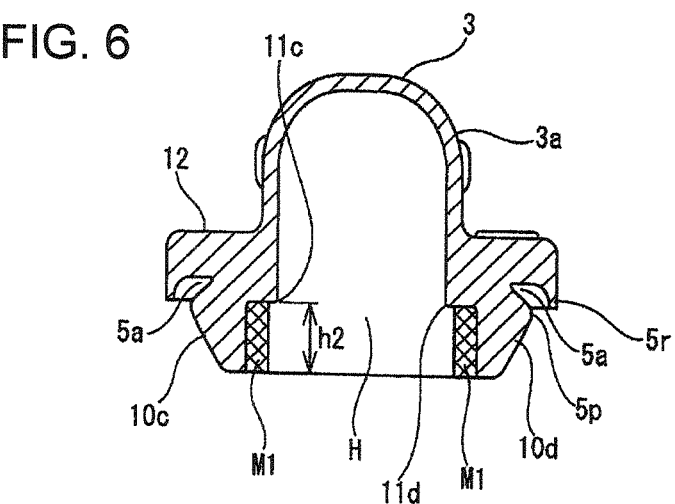
FIG. 6 is a cross-sectional view taken along line B-B in FIG. 2.

In order to reinforce the engagement tube portion 5, padding M1 to M4 is applied as indicated by different cross-sectional hatching with diagonal lines in FIGS. 3, 4, and 5.

First, the padding M1 is applied to the entire length of the inner circumferential surface of the circumferential wall 10 on the leading end side to achieve reinforcement. The thickness of the padding M1 is set at 1.5 mm in the present embodiment.

Moreover, an arc-side reinforcement portion 15 is provided by applying the padding M2 to an inner circumferential surface of the stepped portion 11 at a connecting position between the circumferential wall 3a of the narrow tube portion 3 and an arc-shaped circumferential wall 10a, of a pair of arc-shaped circumferential walls 10a and 10b of the engagement tube portion 5 that face each other in a major axis direction X, which is situated on the outer circumferential side of the bend with respect to the narrow tube portion 3. An arc-side reinforcement portion 16 is provided by applying the padding M3 to an inner circumferential surface at a connecting position between the circumferential wall 3a of the narrow tube portion 3 and the arc-shaped circumferential wall 10b, which is situated on the opposing inner circumferential side.

The arc-side reinforcement portions 15 and 16 are located at inner surfaces that oppose the vehicle body engagement recess 5a, and reinforce the vehicle body engagement recess 5a. Specifically, thick portions of the respective arc-side reinforcement portions 15 and 16 extend to at least those inner surfaces that oppose the engagement protrusion 5p. Thus, the thickness of the engagement protrusion 5p is increased so that the vehicle body B can be stably held between the engagement protrusion 5p and the engagement lip 5r.

In the present embodiment, the thickness of the padding M2 on the outer circumferential side is set at 7.2 mm.

The padding M4 is applied also to opening-side end surfaces of the respective arc-side reinforcement portions 15 and 16. The thickness of the padding M4 is set at 2 mm.

On the other hand, as shown in FIG. 5, the padding M2 and M3 is not applied to an inner circumferential surface spanning from the padding M4 to the leading end opening 5h of the engagement tube portion 5, but rather only the padding M1 is applied thereto, thereby retaining the flexibility of the leading end side of the engagement tube portion 5 so as not to inhibit the ease of insertion during the insertion into the through hole of the vehicle body panel.

Moreover, there are long, narrow linear stepped portions 11c and 11d at respective connecting positions between the circumferential wall 3a of the narrow tube portion 3 and linear circumferential walls 10c and 10d of the engagement tube portion 5 that face each other in a minor axis direction Y. Padding is not applied to any of the inner surfaces and the opening-side end surfaces of the linear stepped portions 11c and 11d.

The thickness of the padding M1, M2, and M3 on the inner surface side is set so as to satisfy M2>M3>M1.

That is to say, while the inner circumferential surface of the circumferential wall 10 on the leading end side is reinforced by applying a uniform thickness of the padding M1 to the entire length of this inner circumferential surface, on the base portion side of the circumferential wall 10, the inner surface side of the arc-shaped circumferential wall 10a, which is situated on the outer circumferential side, is reinforced to the greatest thickness, the arc-shaped circumferential wall 10b, which is situated on the inner circumferential side, is then reinforced, and the linear circumferential walls 10c and 10d are not reinforced.

Moreover, with respect to the height from the leading end opening 5h of the engagement tube portion 5, the height h1 of the arc-side reinforcement portions 15 and 16 is set to be greater than the height h2 of the linear stepped portions 11c and 11d. In this manner, a difference is created between the height of the arc-side reinforcement portions 15 and 16 and the height of the linear stepped portions 11c and 11d so that the leading end 7a of the corrugated tube 7 comes into contact with the arc-side reinforcement portions 15 and 16 first when inserted into the leading end opening 5h.

Both of the arc-side reinforcement portions 15 and 16 extend straight in the axial direction toward the narrow tube portion 3 side. The arc-side reinforcement portion 15, which is situated on the outer circumferential side, constitutes a long reinforcement portion extending to a bending point 3c of the narrow tube portion 3 on the outer circumferential side, and the other arc-side reinforcement portion 16, which is situated on the inner circumferential side, constitutes a short reinforcement portion extending to a bending point 3d of the narrow tube portion 3 on the inner circumferential side.

Moreover, in a portion of the bellows-like tube portion 2 that is close to the engagement tube portion 5 side, in a surface of this portion that faces the same direction as the leading end opening 5h of the engagement tube portion 5, flat surfaces 2f that come into close contact with the vehicle body are provided in top portions of respective ridge portions 2a. The flat surfaces 2f are provided so as to make the contact with the vehicle body B stable.

Furthermore, a guide mark 17 and an arrow mark 18 for alignment are provided on the surface of the flange portion 12 of the engagement tube portion 5.

In the grommet having the above-described configuration, the leading end opening 5h side of the elliptical-shaped engagement tube portion 5 is entirely reinforced by applying the padding M1 to the entire length of the inner circumferential surface of the circumferential wall 10. Therefore, even if the leading end 7a of the corrugated tube 7 hits the leading end surface of the circumferential wall 10, the circumferential wall 10 does not deform.

Moreover, since the inner circumferential surfaces of the arc-shaped circumferential walls 10a and 10b are reinforced by applying the respective padding M2 and M3, even if the leading end 7a of the corrugated tube 7 is inserted from the leading end opening 5h and thrust up, the occurrence of deformation such as a tilt can be prevented.

Consequently, the vehicle body engagement recess 5a of the engagement tube portion 5 fits to a circumferential edge of the through hole H2 of the vehicle body B in a state in which it is in close contact with this circumferential edge, and no gap is left between them. Therefore, the occurrence of a water leak, that is, the entry of water through a gap can be reliably prevented.

The invention is not limited to a grommet to be attached to a wire harness that is arranged so as to be routed between a back door and a vehicle body, and is also applicable as a grommet for a wire harness that is arranged so as to be routed between a side door and the vehicle body.

The invention claimed is:

1. A grommet that is externally fitted to a wire harness and placed in a through hole formed in a vehicle body panel, the grommet being made of a rubber or an elastomer, wherein a first engagement tube portion having an elliptical cross-sectional shape is provided so as to be continuous with and bent from a leading end of a narrow tube portion through which the wire harness passes while coming into close contact with the narrow tube portion, an annular vehicle body engagement recess is provided in an outer circumferential surface of a circumferential wall of the first engagement tube portion, and arc-side reinforcement portions protruding in an inward radial direction are provided at respective connecting positions between a circumferential wall of the narrow tube portion and arc-shaped circumferential walls of the first engagement tube portion that face each other in a major axis direction, and a thickness of the arc-side reinforcement portions is set to be greater than a thickness of connecting positions between the circumferential wall of the narrow tube portion and respective linear circumferential walls that face each other in a minor axis direction.

2. The grommet according to claim 1, wherein thick portions of the respective arc-side reinforcement portions are located at inner surfaces that oppose the vehicle body engagement recess, and the thick portions are not extended to a leading end side of the first engagement tube portion so that the leading end side of the first engagement tube portion has flexibility that is required during insertion into the through hole of the vehicle body panel.

3. The grommet according to claim 2, wherein the arc-side reinforcement portions having an increased thickness and an increased height are provided by applying padding in a thickness direction to inner surfaces of respective stepped portions protruding in the inward radial direction from connecting portions between the circumferential wall of the narrow tube portion and the arc-shaped circumferential walls of the engagement tube portion, and applying padding in a height direction to opening-side end surfaces of the respective stepped portions.

4. The grommet according to claim 3, wherein both of the pair of arc-side reinforcement portions extend straight in an axial direction to the narrow tube portion side, one of the arc-side reinforcement portions that is situated on an outer circumferential side of the bend with respect to the narrow tube portion constitutes a long reinforcement portion extending to a bending point of the narrow tube portion on the outer circumferential side, and the other arc-side reinforcement portion that is situated on an inner circumferential side constitutes a short reinforcement portion extending to a bending point of the narrow tube portion on the inner circumferential side.

5. The grommet according to claim 4, wherein the inner surface of one of the pair of arc-side reinforcement portions that is situated on the outer circumferential side of the bend with respect to the narrow tube portion has a greater thickness of padding applied to the inner surface and is thicker than the other arc-side reinforcement portion that is situated on the inner circumferential side.

6. The grommet according to claim 5, wherein a flange portion is provided in the first engagement tube portion, the flange portion protruding in an outward radial direction from a base portion of the circumferential wall, and the recess for engagement with the vehicle body is formed between the flange portion and the circumferential wall, and a guide for alignment is marked in the flange portion.

7. The grommet according to claim 6, wherein the grommet is arranged between a back door and the vehicle body of an automobile, and has a shape including a second engagement tube portion that is provided at one end in a length direction and engaged with a through hole of the back door, the first engagement tube portion being provided at an end of the grommet opposite the end that has the second engagement tube portion in the length direction and being engaged with the through hole of the vehicle body, and the narrow tube portion and a bellows-like tube portion being interposed between the first and second engagement tube portions at the respective ends.

8. The grommet according to claim 7, wherein a flat surface that comes into close contact with the vehicle body is provided in a top portion of a ridge portion of the bellows-like tube portion that is close to the engagement tube portion.

9. The grommet according to claim 1, wherein the arc-side reinforcement portions having an increased thickness and an increased height are provided by applying padding in a thickness direction to inner surfaces of respective stepped portions protruding in the inward radial direction from connecting portions between the circumferential wall of the narrow tube portion and the arc-shaped circumferential walls of the first engagement tube portion, and applying padding in a height direction to opening-side end surfaces of the respective stepped portions.

10. The grommet according to claim 1, wherein both of the pair of arc-side reinforcement portions extend straight in an axial direction to the narrow tube portion side, one of the arc-side reinforcement portions that is situated on an outer circumferential side of the bend with respect to the narrow tube portion constitutes a long reinforcement portion extending to a bending point of the narrow tube portion on the outer circumferential side, and the other arc-side reinforcement portion that is situated on an inner circumferential side constitutes a short reinforcement portion extending to a bending point of the narrow tube portion on the inner circumferential side.

11. The grommet according to claim 1, wherein the inner surface of one of the pair of arc-side reinforcement portions that is situated on the outer circumferential side of the bend with respect to the narrow tube portion has a greater thickness of padding applied to the inner surface and is thicker than the other arc-side reinforcement portion that is situated on the inner circumferential side.

12. The grommet according to claim 1, wherein a flange portion is provided in the first engagement tube portion, the flange portion protruding in the outward radial direction from a base portion of the circumferential wall, and a recess for engagement with the vehicle body is formed between the flange portion and the circumferential wall, and a guide for alignment is marked in the flange portion.

13. The grommet according to claim 1, wherein the grommet is arranged between a back door and the vehicle body of an automobile, and has a shape including a second engagement tube portion that is provided at one end in a length direction and engaged with a through hole of the back door, the first engagement tube portion being provided at an end of the grommet opposite the end that has the second engagement tube portion in the length direction and being engaged with the through hole of the vehicle body, and the narrow tube portion and a bellows-like tube portion being interposed between the first and second engagement tube portions at the respective ends.

* * * * *